No. 725,319. PATENTED APR. 14, 1903.
E. B. CROCKER.
WINDOW SCREEN.
APPLICATION FILED FEB. 2, 1903.

NO MODEL. 3 SHEETS—SHEET 1.

Witnesses:
H. B. Davis.
M. M. Piper.

Inventor:
Ernest B. Crocker
by Noyes & Harriman
attys

No. 725,319. PATENTED APR. 14, 1903.
E. B. CROCKER.
WINDOW SCREEN.
APPLICATION FILED FEB. 2, 1903.
NO MODEL. 3 SHEETS—SHEET 2.
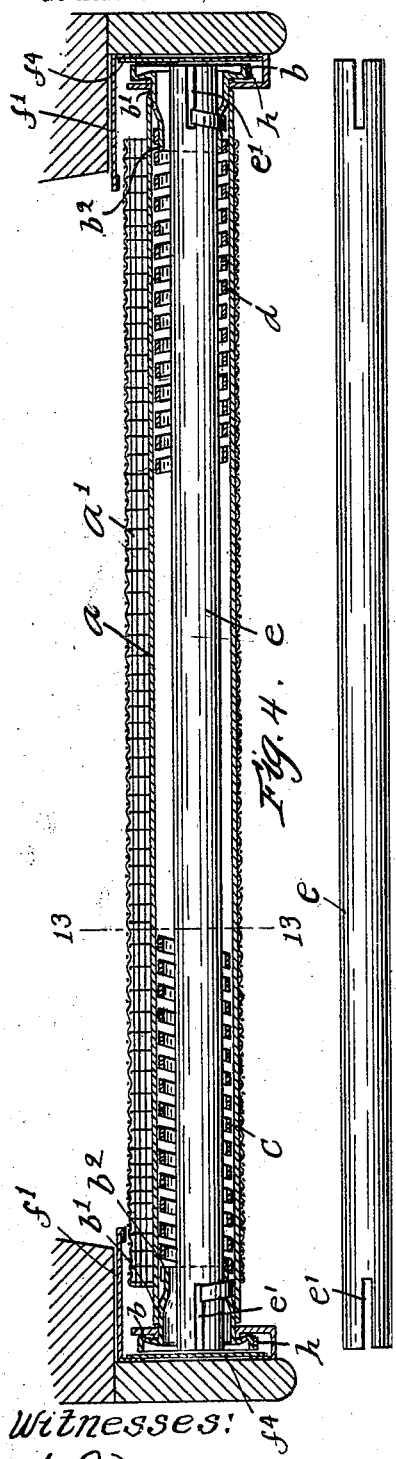
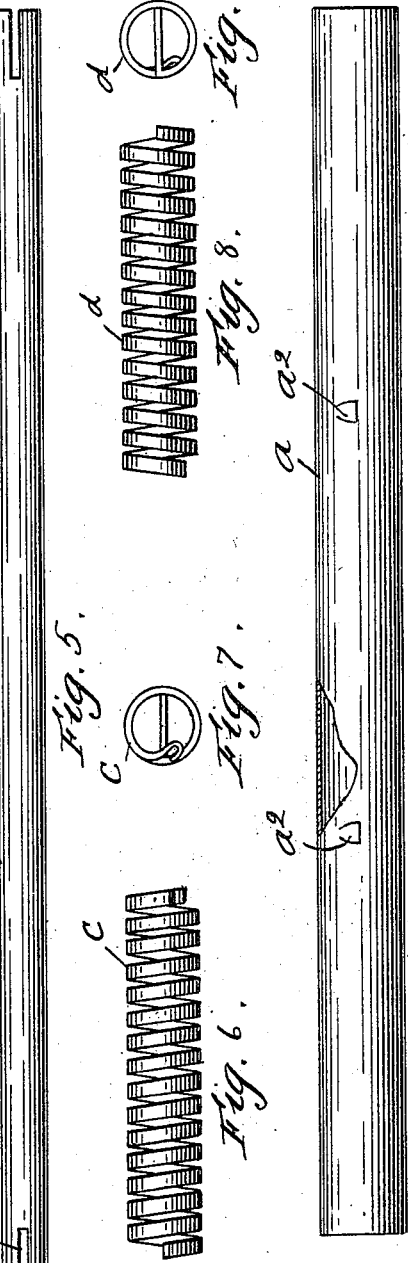
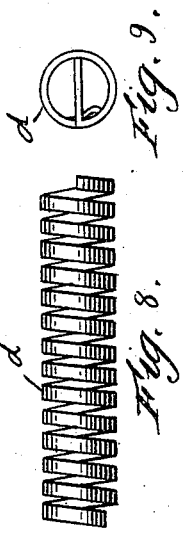
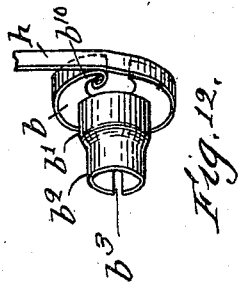
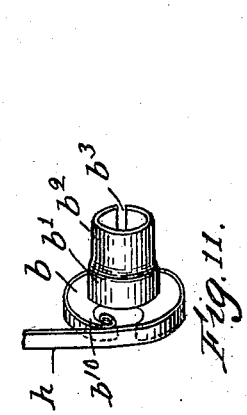
Witnesses:
H. B. Davis.
M. M. Piper.
Inventor:
Ernest B. Crocker
by Ayres & Harriman
Attys No. 725,319. PATENTED APR. 14, 1903.
E. B. CROCKER.
WINDOW SCREEN.
APPLICATION FILED FEB. 2, 1903.
NO MODEL. 3 SHEETS—SHEET 3.

Witnesses:
H. B. Davis.
M. M. Piper.

Inventor:
Ernest B. Crocker
by Bryce & Hartman
Attys.

UNITED STATES PATENT OFFICE.

ERNEST B. CROCKER, OF BOSTON, MASSACHUSETTS.

WINDOW-SCREEN.

SPECIFICATION forming part of Letters Patent No. 725,319, dated April 14, 1903.

Application filed February 2, 1903. Serial No. 141,420. (No model.)

*To all whom it may concern:*

Be it known that I, ERNEST B. CROCKER, of Boston, county of Suffolk, State of Massachusetts, have invented an Improvement in Window-Screens, of which the following description, in connection with the accompanying drawings, is a specification, like characters on the drawings representing like parts.

This invention relates to roller window-screens. In the manufacture of screens of this type it has been customary to interpose compensating springs between the roller on which the screen is wound and the actuating means for said roller; but in case of a wide screen there is liability of the screen swerving more or less to one side or the other as it is operated by reason of the springs acting independently—that is, the spring at one end of the screen-roll yielding more than the spring at the opposite end of said roll; and my invention has for its object to provide a specific form of limiting-stop for limiting the upward movement of the screen, also to construct the lower end of the vertical guide-plate for the screen in such manner that it is adapted to receive and support the pulley around which the tape passes, which passes up over another pulley at the upper end of said guide-plate and is connected with the upper edge of the screen, also to provide specific means for attaching the metallic tape to the upper edge of the screen.

Figure 1:
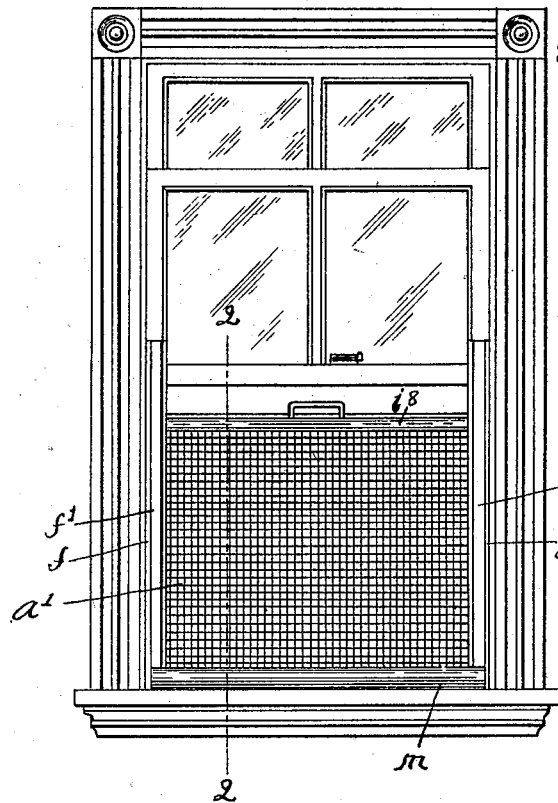
Figure 3:
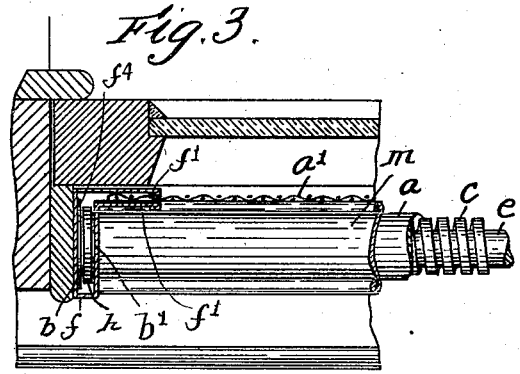
Figure 2:
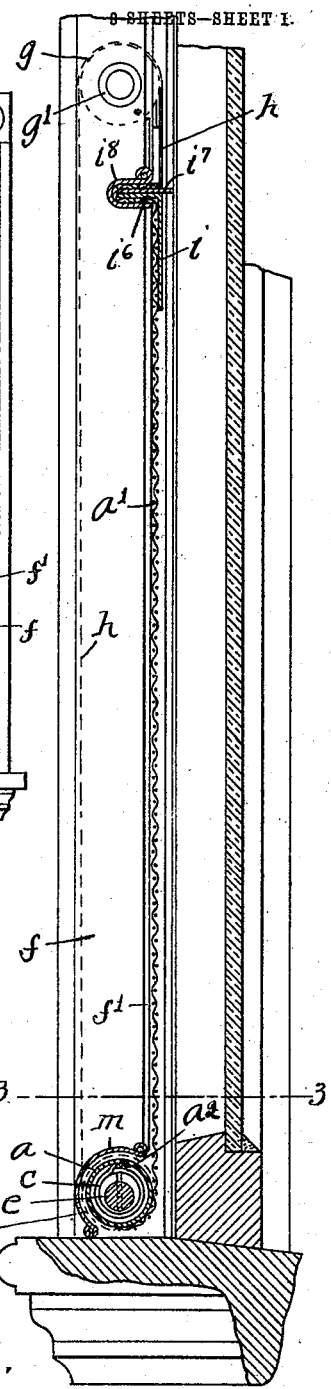
Figure 16:
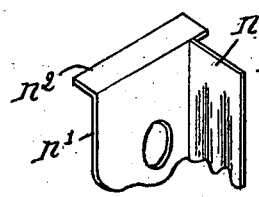
Figure 14:
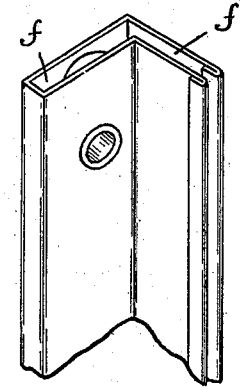
Figure 19:
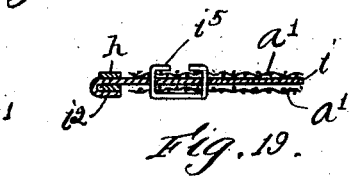
Figure 17:
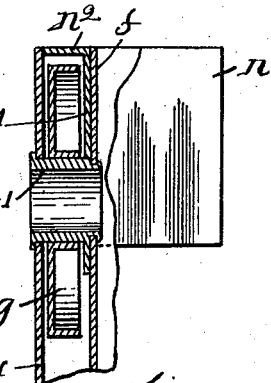
Figures 18, 20:
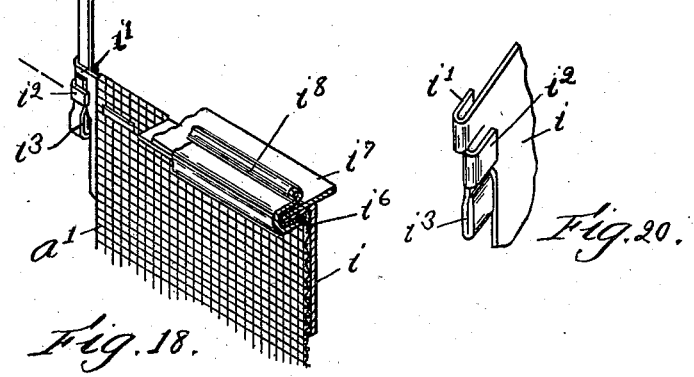
Figure 15:
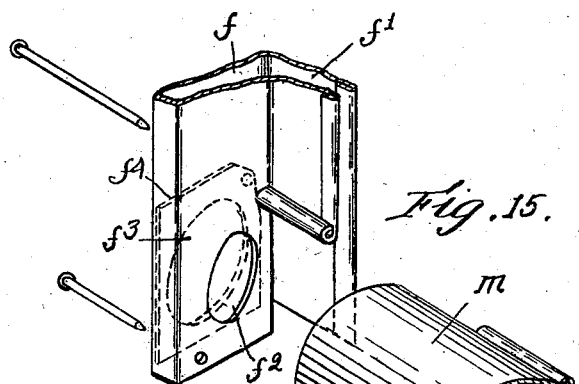
Figure 21:
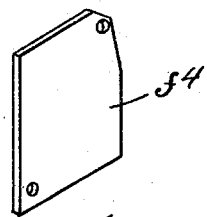

Figure 1 shows in front elevation a roller window-screen embodying this invention.
Fig. 2 is an enlarged vertical section of the screen, taken on the dotted line 2 2, Fig. 1. Fig. 3 is a horizontal section of the screen shown in Fig. 2, taken on the dotted line 3 3. Fig. 4 is a longitudinal section of the screen-roll and end support therefor. Fig. 5 is a detail view of the bar which connects the outer ends of the compensating springs. Figs. 6, 7, 8, and 9 are details showing the two compensating springs. Fig. 10 is a detail of the screen-roll. Figs. 11 and 12 are details of the pulleys or drums at the ends of the screen-roll. Fig. 13 is a cross-section of the screen-roll, taken on the dotted line 13 13, Fig. 4. Figs. 14 and 15 are details of one of the guide-plates. Figs. 16 and 17 are details of the limiting-stop for the screen. Figs. 18, 19, and 20 are details showing the means for attaching the tape to the upper edge of the screen and means for reinforcing or binding the upper edge of the screen. Fig. 21 is a detail of a plate used to cover the opening at the lower end of the guide-plate.

$a$ represents the tubular cylinder or roll, on which the screen $a'$ is wound. This roll will be made of any suitable length and diameter. At each end of the screen-roll $a$ a pulley or drum $b$ is provided, and each pulley or drum has a hub which is adapted to project into and loosely fit the open end of the screen-roll. The hub of each pulley or drum comprises an enlarged portion $b'$ and a reduced end portion $b^2$, the former loosely fitting the open end of the screen-roll and serving as a bearing or support for the end of the screen-roll and the latter serving as a point of attachment for the outer end of the compensating spring, to be described.

The pulleys or drums are suitably supported in fixed bearings, to be hereinafter described, and consequently the screen-roll is supported and freely revoluble on the hubs of said pulleys or drums. Within the screen-roll two spiral springs $c$ $d$ are placed, they being made as a right and left spring, respectively, and disposed at opposite ends of the screen-roll. The inner ends of the springs $c$ and $d$ are attached to the screen-roll and the outer ends to the hubs of the pulleys or drums. The springs $c$ and $d$, which connect the screen-roll with the pulleys or drums, serve as compensating springs for the screen.

As a means of attaching the inner ends of the springs to the screen-roll said roll is formed with lips $a^2$, which are struck inward and leave openings in the roll, and the inner ends of the springs are bent to engage the extremities of said lips.

As a means of attaching the outer ends of the springs to the hubs of the pulleys or drums said hubs are formed with slots $b^3$, through which the outer end portions of the springs pass. Thus it will be seen that the screen-roll is connected with the pulleys or drums by two compensating springs, which are oppositely disposed at the opposite ends of the screen-roll.

To prevent the springs acting independently or one moving or yielding independently of and more than the other, or, in other words, to positively insure the two oppositely-disposed springs operating in unison, I connect the outer ends of said springs together. The means herein shown for accomplishing this result consists of a bar $e$, contained in the screen-roll, which is made of suitable length, its opposite ends entering but not engaging the open ends of the tubular hubs of the pulleys or drums, and the ends of said bar are slotted, as at $e'$, to receive the outer ends of the springs after said ends have passed through the slots in the hubs. The bar is thus connected positively with the outer ends of the springs, and the outer ends of the oppositely-disposed springs are positively connected together, so as to operate in unison.

At the opposite sides of the screen vertical guide-plates are provided which extend along the sides of the casing, and said guide-plates are herein shown as formed of sheet metal folded to produce a right-angular passage, in one part of which, as $f$, the pulleys or drums are placed, and in the other part of which, as $f'$, the edge of the screen runs.

At the lower ends of the guide-plates the pulleys or drums $b$ are supported, and, as herein shown, the inner wall of each guide-plate has a hole $f^2$, through which the hub of the pulley or drum projects, the part $b'$ thereof loosely fitting and having its bearing in said hole. In the outer wall of each guide-plate a larger hole $f^3$ (see dotted lines, Fig. 15) is formed, through which the pulley or drum passes, thereby admitting the pulley or drum to the compartment. The pulleys or drums having been placed in position, the hole $f^3$ is closed by a plate $f^4$. At the upper end of each guide-plate a pulley $g$ is supported, which is mounted loosely upon a stud $g'$, which serves as a pivot therefor. A metallic tape $h$ is connected to the pulley or drum $b$, which passes up through the compartment $f$ and over the pulley $g$ and then down to the upper edge of the screen.

The pulley or drum $b$ is formed with a hook $b^{10}$, and the tape $h$ passes around said pulley or drum and is turned in under said hook $b^{10}$ to thereby connect it with the pulley or drum.

At the upper edge of the screen $a'$ a cross-strip $i$ is secured, the ends of which are formed with wings having a plurality of overturned lips, the lip $i'$ being turned over on the back side of the plate, the lip $i^2$ being turned over on the front side of the plate, and the lip $i^3$ being turned up on the front side of the plate, and the metallic tape $h$ passes down between the lip $i'$ and plate and then around the lip $i^3$ and up between the lip $i^2$ and plate. The metallic tape is thus attached to the upper edge of the screen without the employment of rivets or other fastenings.

The outer or side edges of the screen are attached to the plate $i$ by staples $i^5$ or other equivalent fastenings, and the side edges of the screen thus attached to the ends of the plate $i$ enter the compartments $f'$ of the guide-plates. The upper edge $i^6$ of the plate $i$ is turned over at right angles, and a strip of rubber $i^7$ is laid on top of said portion $i^6$, and the upper edge of the screen is bent around said parts $i^6$ and $i^7$, and a U-shaped clip $i^8$ is thrust onto the screen-covered parts $i^6$ $i^7$, which positively holds the screen and parts $i^6$ $i^7$ assembled.

As a limiting-stop to limit the upward movement of the screen a corrugated plate $n$ is placed in the compartment $f'$ at the upper end of the guide-plate, and said plate $n$ is formed integral with the plate $n'$, which is contained in the compartment $f$, said plate $n'$ having a hole through it for the pivot-stud $g'$ of the pulley $g$. The plate $n'$ is thus held in place by said pivot-stud. The upper edge of the plate $n'$ is bent at right-angles, as at $n^2$, to form a lip which covers the opening at the upper end of the compartment $f$.

A semicircular plate $m$ is provided which covers, and thereby conceals, the screen-roll, said plate being attached at its ends to the guide-plates.

Having thus described my invention, what I claim as new, and desire to secure by Letters Patent, is—

1. In a rolling window-screen, the combination of a tubular screen-roll and screen thereon, a pulley or drum at each end of said screen-roll, two oppositely-disposed compensating springs contained in said screen-roll which are connected at their inner ends to said screen-roll and at their outer ends to said pulleys or drums, and means for connecting the outer ends of said springs together consisting of a bar passing through the screen-roll to the opposite ends of which the outer ends of said springs are attached, substantially as described.

2. In a rolling window-screen, the combination of a tubular screen-roll and a screen thereon, a pulley or drum at each end of said screen-roll, each pulley or drum having a hub which enters the open end of said screen-roll, two oppositely-disposed compensating springs contained in said screen-roll, connected at their inner ends to said screen-roll and at their outer ends to said hubs, and means for connecting the outer ends of said springs together, consisting of a bar passing through the screen-roll to the opposite ends of which the outer ends of the springs are attached, substantially as described.

3. In a rolling window-screen, the combination of a tubular screen-roll, a screen thereon, a pulley or drum at each end of said screen-roll, each pulley or drum having a hub which enters the open end of said screen-roll, two oppositely-disposed compensating springs contained in said screen-roll connected at their inner ends to said screen-roll and at their outer ends to said hubs, and a bar contained in said screen-roll which passes through the compensating springs and is attached to their outer ends, substantially as described.

4. In a rolling window-screen, the combination of a tubular screen-roll, a screen thereon, a pulley or drum at each end of said screen-roll, two oppositely-disposed compensating springs contained in said screen-roll, which are connected at their inner ends to said screen-roll and at their outer ends to said pulleys or drums, and means for connecting the outer ends of said springs together consisting of a bar formed at its opposite ends with slots which receive the outer ends of said springs, substantially as described.

5. In a rolling window-screen, the combination of a tubular screen-roll, a screen thereon, a pulley or drum at each end of said screen-roll, each pulley or drum having a slotted hub which enters the open end of said screen-roll, two oppositely-disposed compensating springs contained in said screen-roll, the inner ends of which are connected to said screen-roll and the outer ends pass through the slots in said hubs, and a bar contained in the screen-roll to which the outer ends of said springs are attached, substantially as described.

6. In a rolling window-screen, the combination of a tubular screen-roll and a screen thereon, a pulley or drum at each end of said screen-roll, each pulley or drum having a slotted hub which enters the open end of said screen-roll, two oppositely-disposed compensating springs contained in said screen-roll, the inner ends of which are connected to said screen-roll, and the outer ends pass through the slots in said hubs, and a bar contained in the screen-roll having slots at each end which receive the outer ends of said compensating springs, substantially as described.

7. In a rolling window-screen, the combination of a tubular screen-roll having inwardly-bent lips and openings, a screen on said roll, a pulley or drum at each end of said roll, a pair of oppositely-disposed compensating springs contained in said roll, each having its inner end formed with a hook for engagement with one of said lips and having its outer end connected to one of the pulleys or drums, and means for connecting the outer ends of said springs together, substantially as described.

8. In a rolling window-screen, the combination of a pair of guide-plates, a pulley supported by each guide-plate, a screen-roll having a screen thereon, pulleys or drums at the opposite ends of said screen-roll, tapes extending from said pulleys or drums over the pulleys supported by the guide-plates, and a stop for limiting the upward movement of the screen attached to each guide-plate, consisting of a corrugated plate interposed between the walls of said guide-plate, and means for attaching it to said guide-plate, substantially as described.

9. In a rolling window-screen, the combination of a pair of guide-plates, a pulley supported by each guide-plate, a screen-roll having a screen thereon, pulleys or drums at the opposite ends of said screen-roll, tapes extending from said pulleys or drums over the pulleys supported by the guide-plates, and a stop for limiting the upward movement of the screen attached to each guide-plate, consisting of a corrugated plate interposed between the walls of said guide-plate, and a vertical portion having a perforation for the stud on which the pulley is mounted, substantially as described.

10. In a rolling window-screen, the combination of a pair of guide-plates, a pulley supported by each guide-plate, a screen-roll having a screen thereon, pulleys or drums at the opposite ends of said screen-roll, tapes extending from said pulleys or drums over the pulley supported by the guide-plates, and a stop for limiting the upward movement of the screen attached to each guide-plate consisting of a corrugated plate interposed between the walls of said guide-plate and means for attaching it to said guide-plate, and a lip which closes the opening at the top of the guide-plate, substantially as described.

11. In a rolling window-screen, the combination of a screen-roll and screen thereon, vertical guide-plates at the opposite ends of said roll, a pair of pulleys or drums at the lower ends of said guide-plates having hubs which support the screen-roll, holes in the adjacent faces of said guide-plates through which said hubs pass and have their bearings, and holes in said guide-plates opposite the aforesaid holes which admit of the passage of the pulleys or drums, substantially as described.

12. In a rolling window-screen, the combination of a screen-roll and screen thereon, a plate extending across the upper end of said screen having wings at each end, each wing having an inwardly-turned horizontal lip along its outer surface, an inwardly-turned horizontal lip along its inner surface, and an upwardly-turned lip along its inner surface, and tapes extending over pulleys with their opposite ends connected with the screen by said lips, substantially as described.

13. In a rolling window-screen, the combination of a tubular screen-roll and screen thereon, a pulley or drum supported at each end of said roll, each pulley or drum having a hub which enters the open end of said roll and serves as a support for said roll, a pair of oppositely-disposed compensating springs contained in said roll which are connected at their inner ends to the roll, and at their outer ends to said hubs, and means for connecting the outer ends of said springs together, substantially as described.

In testimony whereof I have signed my name to this specification in the presence of two subscribing witnesses.

ERNEST B. CROCKER.

Witnesses:
B. J. NOYES,
H. B. DAVIS.